Oct. 26, 1954

J. W. McAULEY 2,692,836

METHOD OF INCREASING THE ELECTRICAL
CONDUCTIVITY OF TIN OXIDE FILMS

Filed June 14, 1951

Inventor
James W. McAuley
By
Nobbe & Swope
Attorneys

Patented Oct. 26, 1954

2,692,836

UNITED STATES PATENT OFFICE 2,692,836

METHOD OF INCREASING THE ELECTRICAL CONDUCTIVITY OF TIN OXIDE FILMS

James W. McAuley, Perrysburg, Ohio, assignor to Libbey-Owens-Ford Glass Company, Toledo, Ohio, a corporation of Ohio Application June 14, 1951, Serial No. 231,545

10 Claims. (Cl. 117—54)

The present invention relates to the production of transparent, electrically conducting films, consisting substantially of tin oxide, on vitreous surfaces by exposing such surfaces while at a temperature approximating their point of softening to the action of a tin compound in fluid form. More particularly, it has to do with a novel way of increasing the conductivity of such films.

The advantages of a film that is sufficiently transparent to be practically invisible, and which is also capable of conducting electricity, will be immediately apparent. However, while electrically conducting films of tin oxide have been made very highly transparent, they normally have rather high resistivities, and considerable difficulty has been experienced in the past in attempting to couple, even the minimum resistivity then obtainable, with high transparency, in such films.

For example, it was known that the resistivity of these films can be decreased by increasing their thickness. However, it is difficult to control the extent to which resistivity is reduced by this means and, in addition, too thick films become excessively foggy, and reduce transparency.

Now, however, I have discovered that an electrically conducting film of tin oxide of any given thickness can have its resistivity materially reduced or, differently expressed, can have its conductivity materially increased, by adding an element from the sixth group of the periodic table having an atomic weight between 127 and 184, and specifically tellurium or tungsten, to the filming material before it is applied to the hot vitreous surface.

I have also found that this can be done with a minimum of effect on the transparency, reflectivity and absorption of the film, and that in some cases the addition agent may actually decrease fogginess in the film.

It is therefore a primary object of this invention to materially decrease the resistivity of transparent, electrically conducting films of tin oxide without impairing their optical properties.

Another object is the provision of a novel method of producing electrically conducting films, consisting substantially of tin oxide, that have improved electrical properties.

Other objects and advantages of the invention will become more apparent during the course of the following description, when taken in connection with the accompanying drawings.

In the drawings, wherein like numerals are employed to designate like parts throughout the same.

Figure 1:
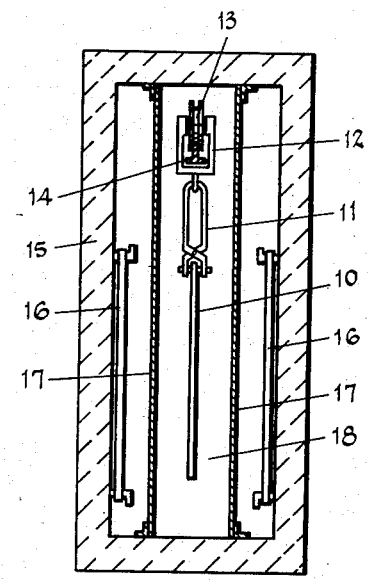
Fig. 1 is a vertical sectional view through a furnace for heating a glass sheet or other vitreous body prior to filming.
Figure 2:
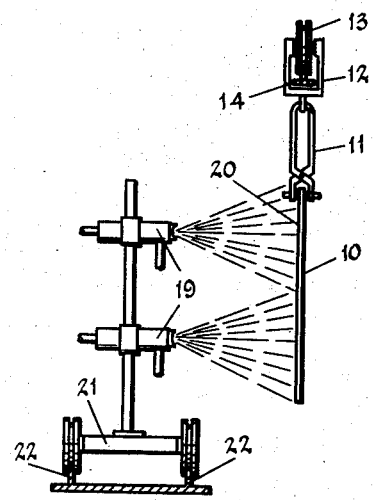
Fig. 2 is a side elevation of a spray apparatus for applying the film of the invention to a heated glass sheet or plate.

Referring now more particularly to the drawings, there has been illustrated in Figs. 1 and 2 one form of apparatus which may be employed in producing the improved transparent, electrically conducting films of this invention.

As indicated above, tin oxide films of this same general character but exhibiting higher resistivities have already been formed by the reaction of a tin compound on the surface of a hot vitreous body, and both organic tin compounds (see application of Romey A. Gaiser et al., Serial No. 106,050, filed July 21, 1949), and inorganic tin compounds (see application of Romey A. Gaiser, Serial No. 654,473, filed March 4, 1946), now abandoned, can be used for this purpose. When these compounds are liquid in their normal state, as in the case of dibutyl tin diacetate, or can be satisfactorily vaporized, as in the case of stannic tetrachloride, they can be used alone as filming materials, and may be applied to the hot surface to be filmed as a liquid or a vapor and in any suitable manner. In these circumstances, the special addition agent of this invention would have to be added directly to the liquid tin compound.

Generally speaking, however, we have obtained the best results by employing a solution of the tin compound in a suitable vehicle, and preferably one having a slight reducing action, such as alcohol. With this type of filming material, the addition agent of the invention can be added either to the tin compound or to the vehicle, before making up the solution, or it may be added after the solution has been made up.

In any event, and regardless of the form in which it is used, I have found it to be advantageous to apply the filming material by directing it, as a mist or spray, against the surface of the heated vitreous body to be filmed. This technique has proved very satisfactory in filming glass for use in aircraft de-icing windows and windshields, and the instant invention will be specifically described in that connection here.

Thus, in accordance with a preferred procedure, and as illustrated in Fig. 1, a properly cleaned glass sheet 10 is suspended from the tongs 11, hung from a carriage 12 which is provided with wheels 13 running on a monorail 14. The carriage 12 is then moved along the rail 14, to carry it into a furnace 15 which can be heated in any suitable manner, such as by means of electrical resistance heaters 16, and is preferably equipped with baffles 17 to provide a more uniform temperature throughout the heating chamber 18.

Within the furnace 15, the sheet 10 is heated to substantially the softening point of the glass, and, immediately thereafter, it is withdrawn from the furnace and positioned before the guns 19 (Fig. 2) where the surface 20 to be filmed is sprayed with the solution of the tin compound to form a film.

One of the tin halides dissolved in a suitable solvent is most often employed for this purpose. Generally, I prefer tin chloride in an organic solvent, and our present standard spray solution is 10% SnCl₄ and 90% isopropyl alcohol by volume. In accordance with one preferred form of the invention, I add tellurium tetrachloride to this solution in the proportion of 0.0051 gram of the salt to each 50 cc. of solution to give an amount of tellurium relative to the tin in the solution that is equal to .046% by weight.

And in accordance with another preferred form of the invention I add tungsten hexachloride to this basic filming solution in the proportion of 0.0095 gram of the salt to each 50 cc. of solution to give an amount of tungsten, relative to the tin in the solution, that is equal to .082% by weight.

Other tellurium and tungsten compounds, such as the other tellurium halides, the nitrates and oxides, and the tungsten halides, can be used instead of tellurium tetrachloride and tungsten hexachloride. The metals themselves may also be used by employing them in finely divided form and dissolving them in a suitable acid before adding them to the spray solution. In the case of tungsten, aqua regia may be used for this purpose; and in the case of tellurium, either aqua regia or nitric acid alone will be satisfactory. In fact, so far as I have been able to discover, any compound of tellurium or tungsten which, by their nature, can be readily put into solution suitable for spraying, will give good results when used as the addition agent according to this invention.

Figure 3:
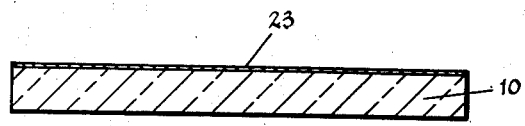
Fig. 3 is a fragmentary, sectional view through a filmed glass sheet.

In order to obtain a uniform coating of the filming material over the surface 20, it is desirable to reciprocate the guns 19 back and forth in front of the glass sheet 10, and for this purpose they are mounted on a wheeled carriage 21 running on tracks 22. The carriage 21 is moved back and forth over the tracks 22 a sufficient number of times to give a film of the desired thickness on the surface of the glass as shown at 24 in Fig. 3.

The exact chemical action that takes place at the glass-air interface, between the tin compound of the filming material and the hot glass during filming, is not completely understood but, regardless of this, the reaction of the tin compound with the hot glass does produce a film of electrically conducting tin oxide on the glass surface.

Such a tin oxide film is clear, transparent and has an electrical resistivity that is millions of times less than the glass itself. Moreover, when the filming material from which the film is produced contains, in addition to the tin compound, the proper amount of a suitable conductivity increasing addition agent, the resistivity of the resulting film will be found to be only a fraction of what it would be if produced in the same manner, and with the same filming material, but without the addition agent.

Figure 4:
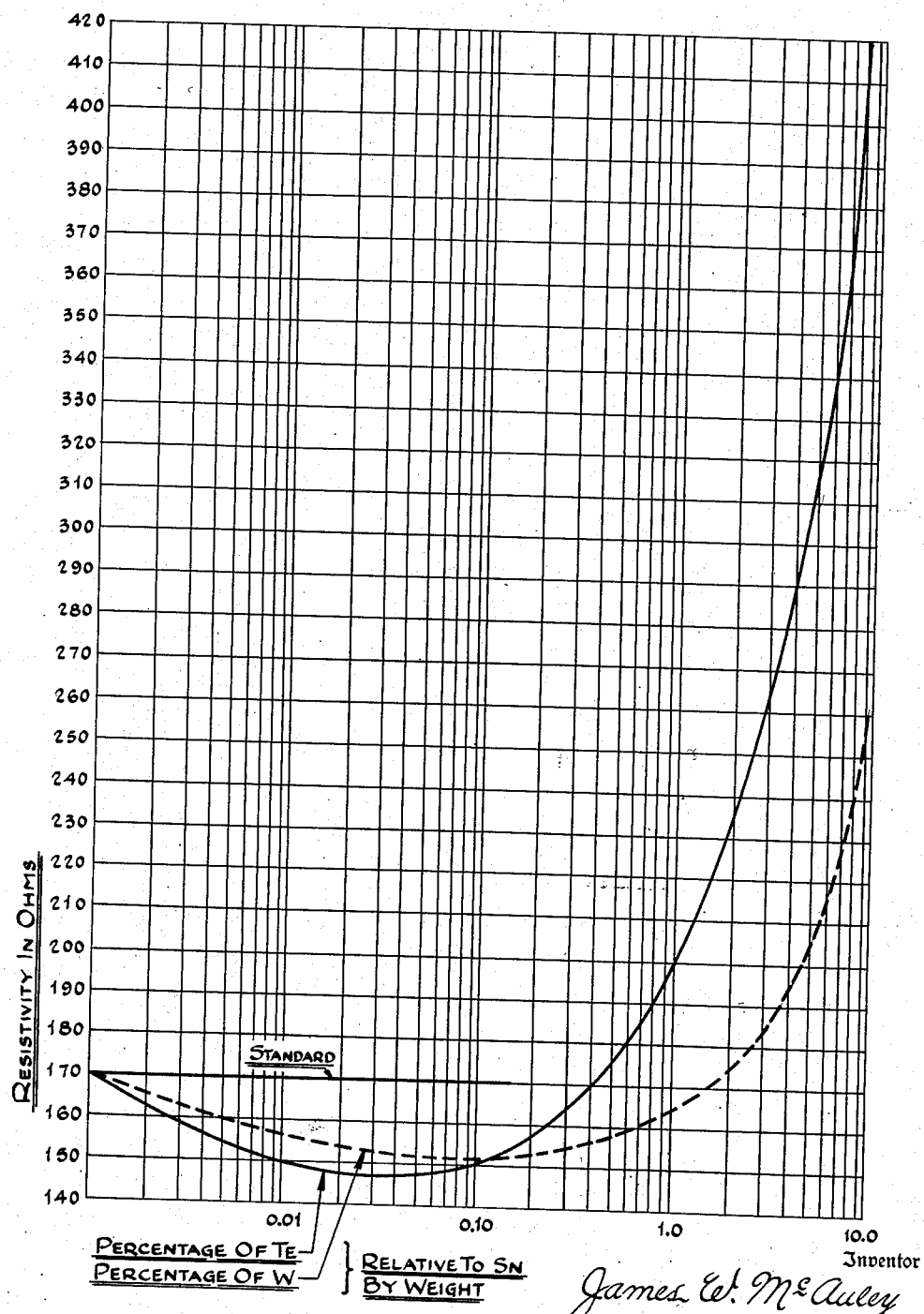
Fig. 4 is a graph showing one curve plotting the percentage of tellurium by weight, relative to the tin that is present in the filming solution, against the resistivity of the resulting film; and a second curve plotting the percentage of tungsten by weight, relative to the tin that is present in the filming solution, against the resistivity of the resulting film.

Just exactly what happens when tellurium or tungsten is used as the addition agent, is best illustrated by the graph in Fig. 4. In running the samples necessary to compile sufficient data for these graphs, identical procedures were followed in filming all of the sample lites, the single variable being the amount of tellurium or tungsten in the filming solution. The glass used was 7" x 7" x ⅛" polished plate glass. Each plate was heated for two and one half minutes at 1200 degrees Fahrenheit and then sprayed with a filming solution containing 10% stannic tetrachloride in 90% isopropyl alcohol as standard ingredients, using a type CV De Vilbiss spray gun and 42 pounds of atomizing air.

Control lites were first produced in the manner just described, with no tellurium or tungsten in the filming solution, and this procedure gave filmed lites with resistances of around 170 ohms per square area and fair clarity.

Additional lites were then produced in exactly the same way except that the stannic tetrachloride-isopropyl alcohol filming solutions employed contained amounts of tellurium tetrachloride or tunsten hexachloride calculated to give percentages up to 10% by weight of the metal relative to the weight of tin in the solution.

As shown by the full line curve in Fig. 4, the addition of tellurium to the filming solution up to around .4% relative to the tin by weight, results in a lower resistivity in the resultant film than is obtained by the same filming solution without the tellurium. In other words, the addition of any amount of tellurium up to .4% relative to the tin in the solution, always produces a film having higher conductivity than a film produced by the same solution without the addition of tellurium. The curve also shows that additions of tellurium in amounts of between approximately .01% and .10%, relative to the tin in the solution, give best results in reducing resistivity: with the low point of the curve occuring with the addition of around .03% of tellurium. During the tests, resistivity drops of as much as 15% below standard were obtained by the addition of tellurium within the range of between .01% and .10%.

However, from around .10% on, the curve rises rather rapidly to show that beyond a certain point additional amounts of tellurium become progressively less effective in reducing resistivity until, beyond about .4% the addition of tellurium in such amounts to the filming material actually increases resistivity beyond that obtained when no tellurium is added.

Similarly, as shown by the dotted line curve in Fig. 4, the addition of tungsten to the filming solution in any amount up to around 1.5%, relative to the tin, by weight, results in lower resistivity in the resultant film than is obtained by the same filming solution without the tungsten. The curve shows that amounts of tungsten between approximately .01% and .5% give best results in lowering resistivity, with the low point in the curve occurring when around .08% of tungsten, relative to the tin by weight, is added to the solution. During the tests, resistivity drops of around 10% below standard were recorded by the addition of amounts of tungsten with the range of between .01% to .5%.

From around .5% tungsten the curve rises more rapidly to show that here too additional amounts of tungsten, above a definite limit becomes less and less effective in reducing resistivity until, beyond about 1.5% the presence of greater amounts in the filming material will actually increase resistivity beyond that obtained when no tungsten is added.

It is to be understood that the forms of the invention herewith shown and described are to be taken as illustrative embodiments only of the same, and that various procedural and compositive changes may be resorted to without departing from the spirit of the invention or the scope of the subjoined claims.

I claim:

1. In a method of producing transparent electrically conducting films consisting substantially of tin oxide by applying a filming material in fluid form, and which comprises an electrically conducting film forming compound of tin, to a hot vitreous surface heated to substantially its point of softening; the step of increasing the electrical conductivity of such films which comprises adding to said filming material, by putting into solution therewith, an amount of a compound of an element selected from the group consisting of tellurium and tungsten to yield an amount of said element equal to not less than approximately .0001% and, in the case of tellurium, not more than approximately .4% and, in the case of tungsten, not more than approximately 1.5% of the tin in said filming material by weight, before applying said filming material to said surface.

2. In a method of producing transparent electrically conducting films consisting substantially of tin oxide by applying a filming material in fluid form and which comprises an electrically conducting film forming tin compound to a hot vitreous surface, the step of increasing the electrical conductivity of such films which comprises adding an amount of a compound of tellurium to give an amount of tellurium equal to more than approximately .0001% and less than approximately .4% of the tin in said filming material by weight to said filming material before applying it to said surface.

3. In a method of producing transparent electrically conducting films consisting substantially of tin oxide by applying a filming material in fluid form and which comprises an electrically conducting film forming tin compound to a hot vitreous surface, the step of increasing the electrical conductivity of such films which comprises adding an amount of a compound of tungsten to give an amount of tungsten equal to more than approximately .0001% and less than approximately 1.5% of the tin in said filming material by weight to said filming material before applying it to said surface.

4. In a method of producing transparent electrically conducting films consisting substantially of tin oxide by applying a filming material in fluid form and which comprises an electrically conducting film forming tin compound to a hot vitreous surface, the step of increasing the electrical conductivity of such films which comprises adding an amount of a compound of tellurium to give an amount of tellurium equal to approximately .03% of the tin in said filming material by weight to said filming material before applying it to said surface.

5. In a method of producing transparent electrically conducting films consisting substantially of tin oxide by applying a filming material in fluid form and which comprises an electrically conducting film forming tin compound to a hot vitreous surface, the step of increasing the electrical conductivity of such films which comprises adding an amount of a compound of tellurium sufficient to give an amount of tellurium equal to between approximately .01% and .10% of the tin in said filming material by weight to said filming material before applying it to said surface.

6. In a method of producing transparent electrically conducting films consisting substantially of tin oxide by applying a filming material in fluid form and which comprises an electrically conducting film forming tin compound to a hot vitreous surface, the step of increasing the electrical conductivity of such films which comprises adding an amount of a compound of tungsten sufficient to yield an amount of tungsten equal to approximately .08% of the tin in said filming material by weight to said filming material before applying it to said surface.

7. In a method of producing transparent electrically conducting films consisting substantially of tin oxide by applying a filming material in fluid form and which comprises an electrically conducting film forming tin compound to a hot vitreous surface, the step of increasing the electrical conductivity of such films which comprises adding an amount of a compound of tungsten to yield an amount of tungsten equal to between approximately .01% and .5% of the tin in said filming material by weight to said filming material before applying it to said surface.

8. In a method of producing a transparent electrically conducting film consisting substantially of tin oxide on a glass surface by heating said glass to substantially its point of softening and then spraying a surface thereof while hot with a solution of a stannic halide in alcohol the step of increasing the conductivity of the films which comprises putting into solution with said halide an amount of a compound of an element selected from the group consisting of tellurium and tungsten to give an amount of the element equal to between approximately .01% and .10% of the tin in said solution by weight before spraying the solution on said surface.

9. The method of producing a transparent electrically conducting film consisting substantially of tin oxide on a glass surface which comprises heating said glass to substantially its point of softening and then spraying a surface thereof while hot with a solution of stannic tetrachloride in alcohol to which has been added an amount of a compound of tellurium to yield an amount of tellurium equal to more than approximately .0001% and less than approximately .4% of the tin in said solution by weight.

10. The method of producing a transparent electrically conducting film consisting substantially of tin oxide on a glass surface which comprises heating said glass to substantially its point of softening and then spraying a surface thereof while hot with a solution of stannic tetrachloride in alcohol to which has been added an amount of a compound of tungsten sufficient to yield an amount of tungsten equal to more than approximately .0001% and less than approximately 1.5% of the tin in said solution by weight.

References Cited in the file of this patent

UNITED STATES PATENTS

| Number | Name | Date |
| --- | --- | --- |
| 2,124,589 | Palm et al. | July 26, 1938 |
| 2,467,144 | Mochel | Apr. 12, 1949 |
| 2,564,706 | Mochel | Aug. 21, 1951 |